Patented Sept. 8, 1925.

1,553,143

UNITED STATES PATENT OFFICE.

WALLER CROW AND JOHN C. SCHAFFER, OF PITTSBURGH, PENNSYLVANIA, ASSIGNORS TO SCHAFFER POIDOMETER COMPANY, OF PITTSBURGH, PENNSYLVANIA, A CORPORATION OF PENNSYLVANIA.

REFRACTORY BRICK.

No Drawing. Application filed September 14, 1920. Serial No. 410,140.

*To all whom it may concern:*

Be it known that we, WALLER CROW and JOHN C. SCHAFFER, citizens of the United States of America, residing at Pittsburgh, Allegheny County, Pennsylvania, have invented new and useful Refractory Brick, of which the following is a specification.

This invention relates to features of physical strength and heat resistance of formed refractory material in the combining and heat treatment preparations thereof.

This invention has utility when incorporated in pavement or abrasive brick, and even in firebrick of basic refractory nature and homogeneous.

In carrying out the invention herein, attention is first given to the production of the body-forming mass. In the making of molded forms or bodies, say of brick, the body-forming mass may be coarse for an open texture article. For a more close or compact body, the body-forming material may be treated to keep the maximum size particles thereof down, and from this breaking or coarse grinding treatment, the fines may be combined with the coarse in a proportion to reduce the voids as may be desired when taken in connection with a fine binder. The open texture brick may be desirable in open-hearth steel furnace linings. The degree of porosity or openness may readily be determined in the grading of the coarse and fines and the proportioning of such coarse and fine body-forming material with the binder.

The resistance properties, not only as against shock, impact and strains, even of traffic, as well as against heat, are brought about herein from ingredients severally deficient. By humid, reducing or moist heat treatment, preferably in a rotary kiln, there is synthetically produced a chemically stabilized and physically fortified substance opening up a wide range of commercial possibility.

An instance for specific adaptation, as basic firebrick refractory, may be taken as exemplary of the extent to which this process and product may be carried. The proportions of the raw materials for such a refractory may approximate

|   | Per cent. |
|---|---|
| Dolomitic limestone | 86 |
| Clay | 10 |
| Lake Superior iron ore | 3 |
| Orthoclase | 1 |

While the slight impurities of silica, iron and alumina in the limestone impart some fluxing properties, the clay, iron ore, and orthoclase or feldspar may be used to bring the flux to the desired conditions.

The humid or reducing heat treatment is conducted upon the ground associated ingredients, preferably as a thick mud, introduced into and progressed through a rotary kiln, not only to remove the $CO_2$ from the calcium and magnesium, but to sear up the nodular residue in a heat treatment, seemingly short of fusing, but shrinking and sealing the nodules in producing particles or coarse grains of matte finish, dark blackish brown exterior, to a slightly lighter brown tinge interior. This leaves the body or nodule interior unclinkered. These particles are of irregular fracture, and while compact and firm, may show minor cavities therein. The firmness is of such a degree as to show considerable resistance to fracture. Notwithstanding the unstable nature of the ingredients, especially as to moisture, heat, or general weathering attacks, this product, even upon fracture or grinding, is uniform throughout. It is not only resistant to weathering, resistant to moisture, but will withstand heat treatment even greatly in excess of that under which it may have been produced.

There is thus disclosed a humid heat treated material of most valuable refractory attributes. Availing of the source from which it is derived, and considering such source as a basis for equal refractory attributes, it has been found the humid heat treatment may be effective in producing a binder for the heat treated refractory material, thereby giving such body a second heat treatment.

The great value of the binder as herein worked out, is that it in its association has the properties of an efficient binder and is so selected as to its ingredients as not to detract from the refractory value of the base or body-forming material. A simple way of working out this selection of the binder may be by adopting the formula for the binder used for the body-forming material.

This binder may be used raw or green, in a fine state of subdivision, with such quantity of water added as may be desirable for pressure molding of the coarse and fines of the body into shape. The fines of the body-forming material may be thoroughly commingled with the binder material before associating with the coarse body-forming material. For heat work, the body-forming material may all approximate fines.

To produce a molded article more readily in the moist state, the binder may have plasticity attributes over that of the raw material, by calcining, or by using oxide or oxides of the alkali earth materials, or a hydrate, instead of the carbonates.

The moisture carrying molded article, of compact body from pressure formation, may be seasoned before subjected to the article completing heat treatment wherein the binder, when selected of similar ingredients as the body-forming material, may be synthetically chemically stabilized into identity with the body-forming material. This identity in practice has resulted in a firebrick of great refractory strength. Notwithstanding the humid heat treatment in the so-called "burning" of this brick was as a maximum only in the range of 2400° F., on being subjected to a heat of 3326° F. it was not warped or in any wise disintegrated. In fact this almost black firebrick is almost metallic in its response to a blow, is hard approaching the range of glass, may be smooth or porous according as the proportions are cared for between the coarse and fines for determination of this property of porosity. This porosity may be increased beyond the fines, when raw material is used for the binder, by slight shrinkage of such raw material. However, in the association of this raw binder with the fines of the body, as well as the proportion of the fines with the body, this may be accurately controlled.

In a measure, the carrying out of this process is analogous to nodulizing a wet mass or slurry by heating it to a sintering temperature in a rotary kiln. A feature of the distinction is that by the humid or reducing heat treatment, special properties are imparted to the product as herein brought out. Accordingly this humid heat treatment is an important feature of the invention in the sintering of the mixture in a rotary kiln, as well as in the making of nodules by such process and mixing such nodules with fines of the same composition, molding the mixture into desired shapes and again heating to sintering temperature. Sintering as herein used is heating to incipient fusion, that is, the beginning of fusion or softening.

What is claimed and it is desired to secure by Letters Patent is:

1. The method of producing a refractory body comprising chemically stabilizing by sintering a mineral body-forming mass in a maximum range approximating 2400° F., associating therewith a material having inherent refractory properties coacting not to detract from the refractory properties of the mass in the body, and by sintering heat treatment in a maximum range approximating 2400° F. causing the material to act as a binder for the mass in producing the body.

2. The method of producing a basic refractory body comprising chemically stabilizing a dolomitic body-forming mass by humid treatment to sintering in a maximum range approximating 2400° F., associating therewith a dolomitic material having inherent therein from subsequent sintering heat treatment refractory properties not to detract from the refractory properties of the mass, and subjecting the associated mass and material to sintering heat treatment in a maximum range approximating 2400° F.

3. A refractory body comprising a chemically stabilized body-forming refractory sintered material, and a humid heat sintered binder for the material coacting in the formed body not to detract from material refractory properties and leaving the body superficially sealed and the interior unclinkered.

4. A refractory body comprising a body-forming reducing heat sintered refractory material, and a reducing heat sintered binder for the material coacting in the formed body not to detract from material refractory properties, and leaving the body superficially sealed and the interior unclinkered.

5. The method of making a basic refractory material for use in lining furnaces which comprises heating dolomitic limestone in the presence of small quantities of oxid of iron and feldspar.

In witness whereof we affix our signatures.

WALLER CROW.
JOHN C. SCHAFFER.